(12) United States Patent
Babich

(10) Patent No.: US 9,784,463 B2
(45) Date of Patent: Oct. 10, 2017

(54) APPARATUS AND METHOD FOR SELF-TEST OF THERMOSTAT

(71) Applicant: Honeywell International Inc., Morristown, NJ (US)

(72) Inventor: Thomas S. Babich, Glen Cove, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 307 days.

(21) Appl. No.: 14/579,758

(22) Filed: Dec. 22, 2014

(65) Prior Publication Data

US 2015/0107816 A1    Apr. 23, 2015

Related U.S. Application Data

(63) Continuation of application No. 13/161,693, filed on Jun. 16, 2011, now Pat. No. 8,950,688.

(51) Int. Cl.
*F24F 11/00* (2006.01)
*G05D 23/19* (2006.01)
*F24D 19/10* (2006.01)

(52) U.S. Cl.
CPC ............ *F24F 11/006* (2013.01); *F24D 19/10* (2013.01); *F24F 11/0086* (2013.01); *G05D 23/1902* (2013.01); *F24F 11/0012* (2013.01); *F24F 2011/0061* (2013.01); *F24F 2011/0068* (2013.01); *F24F 2011/0091* (2013.01)

(58) Field of Classification Search
CPC .. F24F 11/006; F24F 11/0086; F24F 11/0012; F24F 2011/0061; F24F 2011/0068; F24F 2011/0091
See application file for complete search history.

(56) References Cited

U.S. PATENT DOCUMENTS

| 4,146,085 | A | * | 3/1979 | Wills | F25B 13/00 165/11.1 |
| 6,119,950 | A | * | 9/2000 | Albanello | G05D 23/1904 165/267 |
| 6,619,055 | B1 | | 9/2003 | Addy | |
| 2002/0014946 | A1 | | 2/2002 | Bianchi et al. | |
| 2005/0040249 | A1 | * | 2/2005 | Wacker | F24F 11/0086 236/51 |
| 2005/0228607 | A1 | * | 10/2005 | Simons | F24F 11/0086 702/122 |

FOREIGN PATENT DOCUMENTS

DK    WO 2010145657 A1 * 12/2010 .......... F24F 11/0009

* cited by examiner

*Primary Examiner* — Marc Norman
(74) *Attorney, Agent, or Firm* — Husch Blackwell LLP

(57) ABSTRACT

An environmental control system includes at least one of a security monitoring system or a building automation control system. A thermostat is coupled to the at least one system, wherein the thermostat provides feedback as to output signals therefrom to evaluate functioning of the thermostat. The output signals would be coupled to a heating, ventilating and air conditioning system.

5 Claims, 1 Drawing Sheet

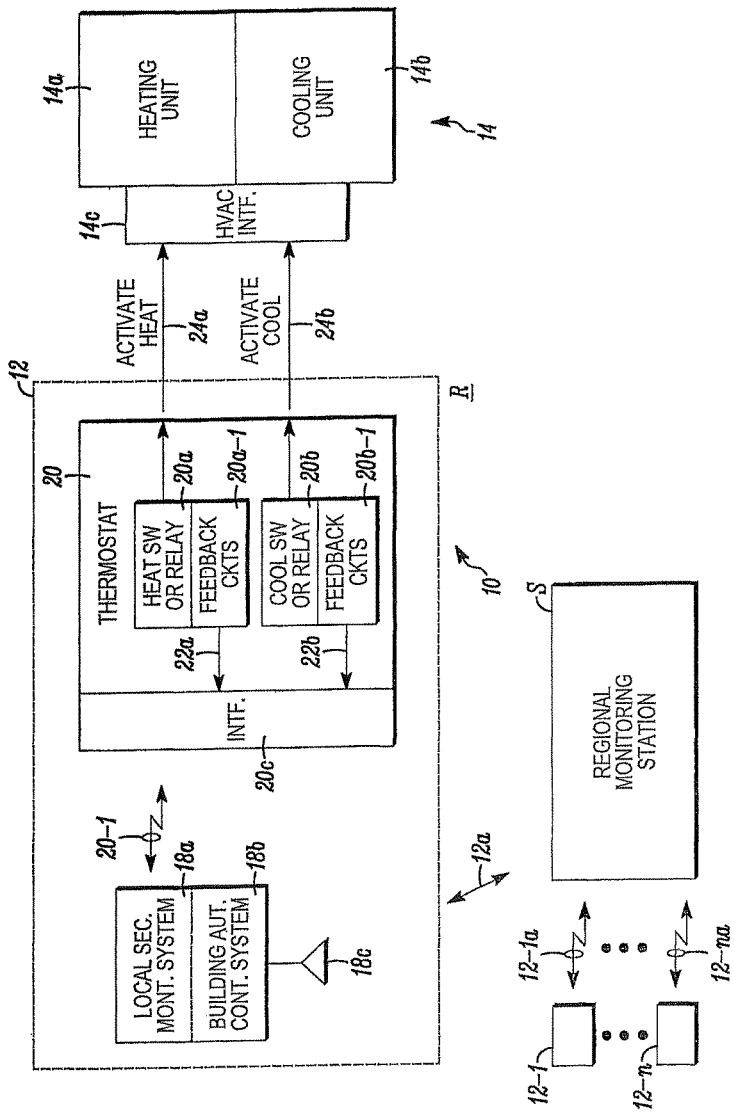

APPARATUS AND METHOD FOR SELF-TEST OF THERMOSTAT

This application is a continuation of U.S. application Ser. No. 13/161,693, filed on Jun. 16, 2011, which is incorporated herein by reference.

FIELD

The application pertains to an apparatus and methods for self-testing of thermostats associated with a security system or an environmental control system associated with a commercial building or residence. More particularly, the application pertains to such an apparatus and methods where confirmatory feedback signals can be generated by the thermostat for diagnostic or self-test purposes.

BACKGROUND

The security space is evolving into green solutions, home automation, lighting control, and HVAC integration. The challenge going forward is that security dealers monitoring security systems in homes with integrated HVAC thermostats will be getting the calls when the HVAC system is not operating, whether it is caused by the security/home automation/thermostat or not.

They will be spending money to investigate HVAC malfunctions not associated with the security system, home automation system, or thermostat by having to send a service technician to the site to rule out the security/home automation/thermostat. Such unnecessary trips can become a significant expense.

BRIEF DESCRIPTION OF THE DRAWINGS

FIG. 1 is a block diagram illustrating aspects of a system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

In one aspect, a thermostat can be integrated into a security system or home automation system (using wired, wireless, z-wave, ziggbie, or other technology). The thermostat includes a self-test feature that can ensure that when the temperature is raised or lowered, whether on site or remotely, the proper thermostat relay is triggered/restored, thereby sending the proper signal to HVAC equipment then responsible for heating or cooling. A message can be transmitted that the heating and cooling interface relays are functioning properly and when required. In such instances, HVAC malfunctioning usually resides in other parts of the HVAC system, such as a blower, a boiler, air conditioner, or power to the boiler.

In operation, a homeowner or business calls a central station complaining of an HVAC issue. The central station can ask an on-site person to initiate a test, can initiate the test remotely, or can simply monitor the indicators of a continual test.

Central station personnel can then ask the on-site person to raise the thermostat set point above the actual temperature in the room or region being monitored. Conversely, the central station can raise the thermostat set point remotely without a local presence. When the thermostat is above the temperature, there should be the appropriate relay activation/deactivation (In the summer, the cooling, for example, air conditioning, function should turn on. In the winter, the heating function would turn off.). The self-test would send a message indicating the actual state of the relay to the security system/home automation system that then transmits the message to the central station.

The central station personnel or the on-site person can then lower the set point temperature to ensure the relays switch state once again. In this way, the central station personnel can eliminate the need for a service call due to malfunctioning equipment beyond the scope of the equipment they installed and are monitoring. Advantageously, they can fully test the thermostat functionality, thereby ensuring relay activation/deactivation for heating/cooling/humidity above and below a set point threshold.

FIG. 1 illustrates an overall combination 10 in accordance herewith that includes an environmental control element 12 that is coupled to a conventional HVAC system 14. The system 14 includes heating and air conditioning sub-systems 14a, 14b and a connection interface 14c. The system 14 responds to control signals generated by the control element 12 as discussed below. The combination 10 provides heating and/or cooling for a monitored region R, a residence, or other building.

The control element 12 can include one or both of a local security monitoring system 18a and/or home or building automation control system 18b. A local thermostat 20, which monitors temperature in the region R, is in wired or wireless communication, indicated at 20-1, with one or both of the systems 18a, 18b. The thermostat 20, on a programmed or non-programmed basis, couples heating or cooling control signals, such as 24a, 24b, via a heating signal output port and a cooling signal output port to the heating and air conditioning units 14a, 14b to heat or cool the region R as would be understood by those of skill in the art.

It will be understood that the specific details of the thermostat 20, except as described herein, are not limitations of the scope of the claims hereof. Embodiments implemented with various types of thermostats come within the spirit and scope hereof. Similarly, the details of any associated HVAC system are not limitations of the claims hereof.

In accordance herewith, the thermostat 20 includes a heater switch, for example, a solid state switch or a relay, 20a and an air conditioning switch, a different switch or relay, 20b that provide the switched control signals 24a, 24b to the HVAC system 14. In addition, the thermostat 20 includes circuitry 20a-1, 20b-1 to generate feedback signals 22a, 22b indicative of the real-time values of the signals 24a, 24b.

The feedback signals 22a, 22b can be coupled or transmitted via an interface 20c to the system or systems 18a, 18b to provide information to the system(s) 18a, 18b as to the values or states of the output signals 24a, 24b being coupled to the HVAC interface 14c. Those feedback signals received via the communication link 20-1 can be evaluated at the respective security system 18a or automation control system 18b to determine if the switches or relays 20a, 20b are functioning properly.

It will also be understood that various circuits can be used to generate the feedback signals 22a, 22b from the thermostat 20. For example, optical isolators or operational amplifiers coupled to the control signals 24a, 24b could be used to generate the feedback signals. The exact details thereof are not limitations of the claims hereof.

The thermostat 20 can include the transmission interface 20c that receives the feedback signals 22a, 22b and forwards them via the link 20-1 to the system(s) 18a, 18b. It will be understood that where the feedback message or messages sent from the thermostat 20 indicate that the thermostat 20 is working properly and the heating unit 14a or cooling unit 14b is not responding properly, service of one or both of those units may be required. For example, a defective boiler or furnace, such as 14a, a failure of power to the boiler or furnace, or a malfunction of the air conditioner 14b may need to be addressed quite apart from any of the systems 18a, 18b or thermostat 20.

The structure 12 could also be in wireless communication via an antenna 18c and communication link 12a with a regional monitoring station S where monitoring personnel can respond to incoming messages from the structure 12. In the event that individuals working or residing in the monitored region R contact the monitoring station S relative to performance of the HVAC system 14, the feedback signals 22a, 22b provide diagnostic information as to where a problem might be located.

It will also be understood that the central station S might be in real-time, wireless communication with a plurality of environmental control systems 12-1, 12-2, 12-3 . . . -12-n comparable to the system 10. As a result of being able to evaluate feedback from the respective thermostats comparable to the thermostat 20, personnel at the central station S will be able to more effectively and promptly provide preliminary assessments as to where maintenance is needed with respect to displaced, respective environmental control systems 12-1 . . . 12-n.

From the foregoing, it will be observed that numerous variations and modifications may be effected without departing from the spirit and scope of the invention. It is to be understood that no limitation with respect to the specific apparatus illustrated herein is intended or should be inferred.

It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A method comprising:
providing a thermostat to control temperature in a region being monitored;
providing a self-test feature for the thermostat;
determining that the self-test feature should be activated by the thermostat;
the self-test feature altering a temperature setting of the thermostat in a first direction and then monitoring a first output signal from the thermostat;
the self-test feature altering the temperature setting in a second direction, opposite the first direction, and then monitoring a second output signal from the thermostat; and
determining if the first output signal and the second output signal correspond to expected output signals.

2. The method as in claim 1 further comprising providing a monitoring facility and evaluating the first output signal and the second output signal at the monitoring facility.

3. The method as in claim 1 further comprising determining if maintenance of the thermostat is needed when the first output signal and the second output signal do not correspond to the expected output signals.

4. The method as in claim 1 further comprising testing circuit activation of the thermostat.

5. The method as in claim 1 further comprising testing functionality of a heating input, a cooling input, or a humidity input of the thermostat.

* * * * *